Sept. 4, 1945.  A. R. NAILOR  2,384,127
PARACHUTE
Filed Jan. 17, 1944
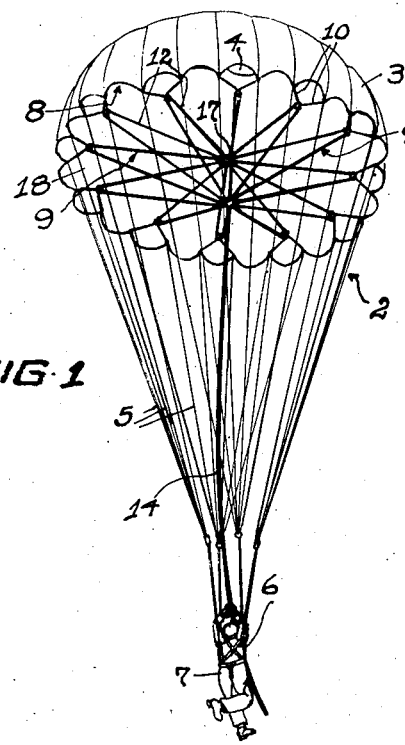
FIG. 1
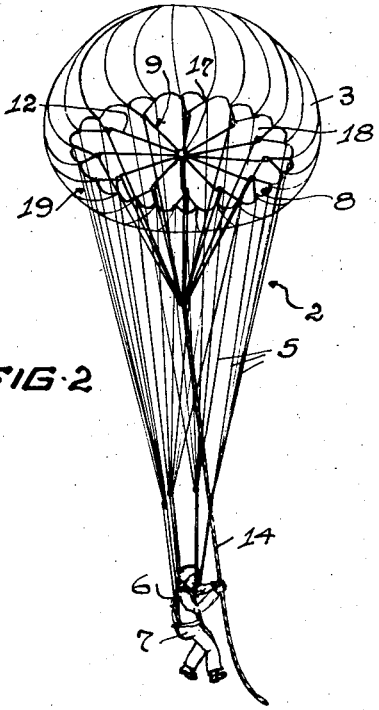
FIG. 2
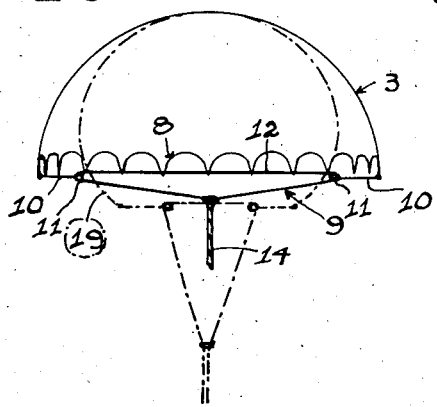
FIG. 3
FIG. 4
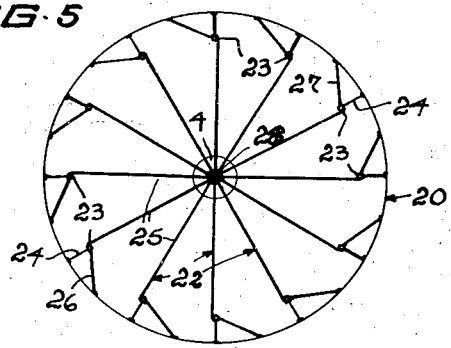
FIG. 5
FIG. 6
INVENTOR.
BY ALBERT R. NAILOR

Patented Sept. 4, 1945

2,384,127

UNITED STATES PATENT OFFICE 2,384,127

PARACHUTE

Albert R. Nailor, Mentor, Ohio

Application January 17, 1944, Serial No. 518,632

3 Claims. (Cl. 244—152)

This invention relates in general to parachutes and, more particularly, to a parachute embodying means controlling its descending speed and collapse after the jumper has reached the ground.

Heretofore, the descending speed of a parachute has been regulated by controlling the volume of air escaping from the parachute through valve controlled openings in its top portion. However, this arrangement is unsatisfactory, as valve controlled air outlet openings, when opened, effect a substantial decrease in the air pressure necessary for proper shaping of the canopy to permit proper control of the parachute under adverse conditions.

The general object of the present invention is the provision of a parachute which embodies means adapted to control the air inlet opening of the canopy of a parachute to regulate its descending speed by changing its shape and diameter without materially changing the air pressure in the canopy necessary for proper control of the parachute when in the air.

This general object of the invention is attained by attaching to the lower peripheral edge of the canopy of a parachute manually actuated mechanism adapted to pull said edge inwardly to effect a decrease in the diameter and size of the air inlet opening at the bottom edge of the canopy.

Another object of the invention therefore is the provision of a parachute with manually actuated means secured to the bottom edge of its canopy and adapted to decrease diameter and size of the bottom opening of said canopy, all for the purpose of controlling the descending speed of the parachute when in the air.

A further object of the invention is the provision of a parachute with means secured to the bottom edge of its canopy, so constructed as to effect contraction of said edge by inwardly directed forces when the pilot of the parachute actuates such means.

Still another object of the invention is the provision of a parachute with a plurality of tackle means attached to the lower edge of its canopy, with each of said tackle means formed by two blocks secured to diagonally opposed portions of the said edge, which blocks are coupled by a single cord extended therethrough so that the ends of the cord extend downwardly, all for the purpose of effecting symmetrical contraction of the lower edge of the canopy by a pull cord having all end portions of the cords of said tackle means attached thereto.

A still further object of the invention is the provision of a parachute of the type referred to above, with a canopy having a resilient lower edge by mounting in said edge yielding strip means to effect instantaneous opening of the parachute when its customary rip cord has been pulled.

In addition, the invention has certain other marked superiorities which radically distinguish it from presently known structures. These improvements or superiorities embodying certain novel features of construction are clearly set forth in the following specification and the appended claims; and several preferred forms of embodiment of the invention are shown with reference to the accompanying drawing forming part of the specification.

In the drawing:

Fig. 1 is a perspective view of a parachute embodying the invention;

Fig. 2 is a perspective view of the parachute shown in Fig. 1, when the control mechanism for the air inlet opening of the parachute has been actuated;

Fig. 3 is a diagrammatic view of a parachute showing in full lines the air inlet opening of its canopy fully opened and in dash-dotted lines contracted by actuation of tackle mechanism attached to the lower edge of said canopy;

Fig. 4 is a fragmentary side elevation of a lower edge portion of a canopy with reenforcing strip and ear means for attaching tackle mechanism thereto and yielding strip means facilitating opening of the parachute;

Fig. 5 is a diagrammatic bottom view of a parachute with somewhat modified means for controlling the air inlet opening of the parachute; and Fig. 6 is a diagrammatic side view of the parachute shown in Fig. 5.

Referring now in detail to the drawing, parachute 2 of common construction and conventional style embodies a canopy 3 having the usual air escape hole 4. This canopy which suspends on suspension cords or shroud lines 5, a harness in which the pilot or jumper 7 is strapped, has attached to its lower edge 8 a plurality of double tackles 9 connected to said edge by cords 10 so that each pair of cords 10 supports one block 11 of these tackles. Each tackle has its blocks 11 coupled with each other by a cord 12 which runs through said blocks and has its ends attached to a pull cord 14 extended downwardly for actuation by the pilot or jumper. Attachment of cords 10 to lower edge 8 of the canopy is facilitated by a strip of reenforcing material 15 sewed to the canopy near said lower edge and shaped to form ear portions extended beyond said edge to permit of proper attachment of the cords 10 to the canopy without interference with its shroud lines 5. Preferably, as shown, lower edge 8 of the canopy is additionally reenforced by a strip or heavy cord 16 of rubber, coiled wire or similar material tending to unfold when doubled-back, so as to facilitate opening up of the canopy and holding of the circular shape of its lower edge when the parachute is in the air. The thus constructed parachute, when fully opened up, will function in the same manner as any known parachute and descends at a speed proportionate to the load carried thereby. However, such descending speed can readily be controlled when tackles 9 are actuated by pulling the pull cord 14 downwardly so that tackle cords 12, all of which are preferably coupled with each other as at 17, contract air inlet opening 18 at the bottom edge of the canopy. This action of tackles 9 effects a circumferential, symmetrical reduction in size and diameter of air inlet opening 18, changes the shape of the canopy and forms the lower portion of said canopy to cone-shaped ring surface 19 which encircles the decreased inlet opening 18 and effects steadying of the descending parachute. A decrease in size and diameter of air inlet opening 18 and the deformation of the canopy decreases its carrying capacity and therewith effects substantial acceleration of the descending speed of the parachute, which speed can readily be controlled by the pull exerted on pull cord 14 by the pilot. This control of the speed is absolute, as tackles 9 effect differential movements between pull cord 14 and the edge of the canopy.

The described construction of the parachute is also of advantage in landing, especially when a landing is made in high wind, as the canopy when actuated upon in the manner described above by pull cord 14, can readily and quickly be collapsed to avoid dragging of the jumper over the ground. In the modified form of the invention shown in the diagrams of Figs. 5 and 6, the canopy 20 of the parachute has attached to its lower edge 21 a plurality of double tackles 22, each of which has its blocks 23 secured to the edge of the canopy by a single cord 24 and its blocks 23 coupled with each other by a cord 25, the ends 26, 27 of which are secured to the edge of the canopy. This arrangement in which the middle portions of all cords 25 are coupled with a pull cord 28 permits a more rapid contraction of the air inlet opening of the parachute.

Having thus described my invention, what I claim is:

1. In a parachute a canopy with a substantially circular air intake opening at its lower edge, pairs of diametrically opposed tackle blocks secured to the edge of said canopy adjacent to its intake opening, a single, endless rope means for each pair of said diametrically opposed tackle blocks coupled therewith and forming a tackle therewith, and actuating means for said tackles coupled with their endless ropes, said actuating means effecting control of the diameter of said circular intake opening and said endless ropes effecting symmetrical contraction and expansion of said circular intake opening by said tackles.

2. A parachute as described in claim 1, wherein said canopy has its edge adjacent to the air intake opening reenforced by a narrow strip of material sewn to said canopy, wherein said strip at spaced points is extended over the edge of said canopy and has its extended portion looped to provide said canopy with a plurality of loops extended from said canopy circumferentially thereof, and wherein each tackle block is attached to a rope secured to adjoining loops of said canopy.

3. A parachute as described in claim 1, wherein said canopy has its edge adjacent to said air intake opening reenforced by a foldable resilient strip attached to said canopy circumferentially thereof, said strip tending to straighten out when doubled back and facilitating rapid opening of the parachute when folded.

ALBERT R. NAILOR.